(12) United States Patent
Lucchi (10) Patent No.: US 9,850,072 B2
(45) Date of Patent: Dec. 26, 2017

(54) CLEANING-IN-PLACE SYSTEM FOR FLAT BELTS

(75) Inventor: Marco Lucchi, Munchestein (CH)

(73) Assignee: Habasit AG, Reinach (CH)

( * ) Notice: Subject to any disclaimer, the term of this patent is extended or adjusted under 35 U.S.C. 154(b) by 954 days.

(21) Appl. No.: 12/915,258

(22) Filed: Oct. 29, 2010

(65) Prior Publication Data

US 2011/0061693 A1  Mar. 17, 2011

Related U.S. Application Data

(63) Continuation-in-part of application No. 12/856,578, filed on Aug. 13, 2010, now abandoned, and a continuation-in-part of application No. 12/288,602, filed on Oct. 22, 2008, which is a continuation-in-part of application No. 11/672,568, filed on Feb. 8, 2007.

(51) Int. Cl.
| | |
|---|---|
| *B08B 3/00* | (2006.01) |
| *B65G 23/06* | (2006.01) |
| *B08B 3/02* | (2006.01) |
| *B65G 45/22* | (2006.01) |

(52) U.S. Cl.
CPC .............. *B65G 23/06* (2013.01); *B08B 3/022* (2013.01); *B65G 45/22* (2013.01)

(58) Field of Classification Search
CPC .......... B08B 3/022; B65G 45/22; B65G 23/06
USPC ................................... 134/48, 198
See application file for complete search history.

(56) References Cited

U.S. PATENT DOCUMENTS

| | | | |
|---|---|---|---|
| 1,668,778 A | 5/1928 | Menningen | |
| 1,922,357 A | 8/1933 | Divney et al. | |
| 1,934,819 A | 11/1933 | Rorabeck | |
| 3,016,235 A | 1/1962 | Cnudde | |
| 3,017,986 A | 1/1962 | Ackles | |
| 3,031,895 A | 5/1962 | Kindig | |
| 3,680,684 A | 8/1972 | Purdy et al. | |
| 4,218,932 A | 8/1980 | McComber | |
| 4,816,010 A | 3/1989 | Reynolds | |
| 5,203,861 A | 4/1993 | Irwin et al. | |
| 6,223,905 B1 | 5/2001 | Buisman et al. | |
| 6,367,613 B1 | 4/2002 | Montgomery | |
| 6,740,172 B1 | 5/2004 | Griffiths et al. | |
| RE38,607 E | 10/2004 | Guldenfels et al. | |
| 6,978,880 B2 | 12/2005 | Barrett | |
| 7,055,675 B2 | 6/2006 | Behymer et al. | |

(Continued)

FOREIGN PATENT DOCUMENTS

| | | |
|---|---|---|
| CN | 101132975 | 1/2005 |
| CN | 1689938 | 11/2005 |

(Continued)

OTHER PUBLICATIONS

Water Management Resources, Modular Belt Washers, retrieved from http://watermr.com/modular-belt-washer/ [retrieved on Jan. 2, 2014].

*Primary Examiner* — Michael Barr
*Assistant Examiner* — Benjamin L Osterhout
(74) *Attorney, Agent, or Firm* — Hodgson Russ LLP (57) ABSTRACT

A cleaning-in-place system for use with an easily cleanable flexible belt. A sprocket is provided with a body having a first opening formed between adjacent pairs of teeth. The opening extends toward the center of the sprocket to provide access to the underside of the belt, when the belt engages with the sprocket, for application of cleaning medium.

11 Claims, 11 Drawing Sheets

(56) References Cited

U.S. PATENT DOCUMENTS

| | | | |
|---|---|---|---|
| 7,111,724 B2 | 9/2006 | Donnenhoffer | |
| 7,147,099 B2 | 12/2006 | Guernsey et al. | |
| 7,225,915 B2 | 6/2007 | Kelly et al. | |
| 7,370,749 B2 | 5/2008 | Smith | |
| 7,407,051 B1 | 8/2008 | Farris et al. | |
| 2002/0144880 A1* | 10/2002 | Ikemoto et al. | 198/469.1 |
| 2004/0026213 A1* | 2/2004 | Blue | 198/495 |
| 2004/0222072 A1 | 11/2004 | Verdigets et al. | |
| 2005/0117381 A1* | 6/2005 | Takano et al. | 365/145 |
| 2005/0199471 A1* | 9/2005 | Barrett | 198/495 |
| 2005/0241921 A1* | 11/2005 | Guernsey et al. | 198/834 |
| 2007/0045087 A1* | 3/2007 | Bude et al. | 198/835 |
| 2007/0084699 A1 | 4/2007 | Smith | |

FOREIGN PATENT DOCUMENTS

| | | |
|---|---|---|
| CN | 101400923 | 4/2009 |
| EP | 0569071 | 11/1993 |
| FR | 2601660 | 7/1986 |
| GB | 624204 | 5/1949 |
| WO | 2005009874 | 2/2005 |
| WO | 2007092774 | 8/2007 |
| WO | 2008/006232 A1 | 1/2008 |
| WO | 2008095322 | 8/2008 |

\* cited by examiner

CLEANING-IN-PLACE SYSTEM FOR FLAT BELTS

CROSS-REFERENCE TO RELATED APPLICATIONS

The present application is a continuation-in-part of U.S. patent application Ser. No. 12/856,578 filed on Aug. 13, 2010, the disclosure of which is incorporated herein by reference, and is also a continuation-in-part of U.S. patent application Ser. No. 12/288,602, filed on Oct. 22, 2008, which is a continuation-in-part of U.S. patent application Ser. No. 11/672,568, filed on Feb. 8, 2007, the disclosures of which are incorporated herein by reference.

FIELD OF THE INVENTION

The present invention relates to flat belt conveying apparatus.

BACKGROUND OF THE INVENTION

Figure 7A:
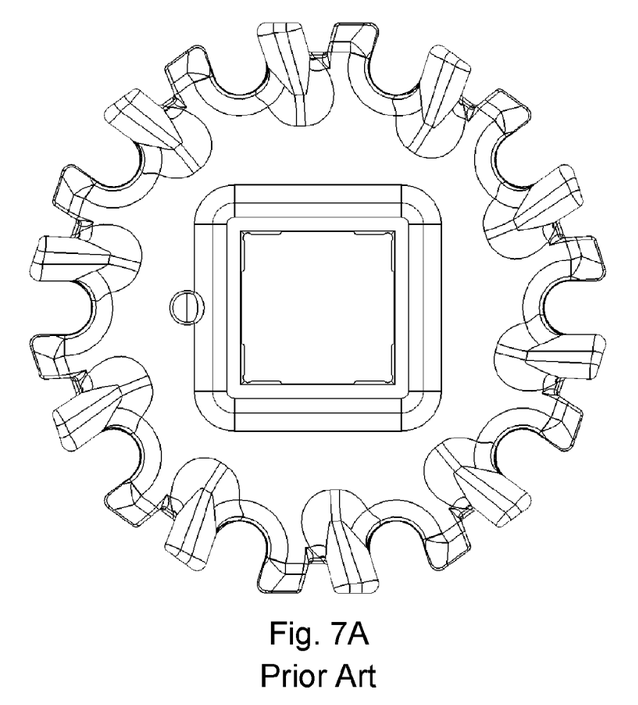
FIG. 7A is a side elevational view of a prior art sprocket.
Figure 7B:
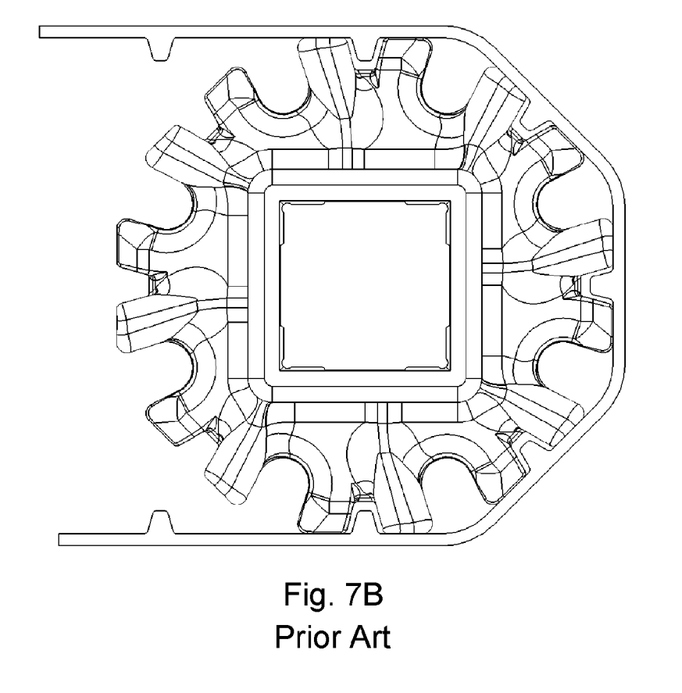
FIG. 7B is a side elevational view of the prior art sprocket with a flexible belt engaged thereon.

Sprockets for driving flat belts are usually made from stainless steel or plastic that is machined or molded. In food processing applications, sprocket drives are a particularly critical area for cleaning. It is important to be able to periodically remove the residual matters from the sprockets and on the rear side of the belt, in order to avoid bacteria growth and spoilage of the food processed on the belt. For this purpose sprockets have been designed with large openings to allow cleaning medium to pass from the side and reach the critical areas to be cleaned. Such sprockets are disclosed for use with modular belts in U.S. patent application Ser. No. 12/288,602. However, such sprockets are not ideally suited for use with flat (non-modular) belts. For example, as depicted in FIGS. 7A-7B, the shape of the teeth, and lack of support between adjacent pairs of teeth, allow a flexible belt to buckle as it is forced around the periphery of the sprocket while the belt is under tension. Over time, this buckling causes damage to the belt including cracks on the surface of the belt.

Accordingly, there is a need for an improved cleaning system that incorporates a sprocket for use with flexible belts and that avoids the above-described shortcomings.

SUMMARY OF THE INVENTION

The present invention meets the above described need by providing a sprocket for a flat belt. The flat belt may have transverse ribs. The sprocket rotates about a shaft. The sprocket has a central opening for receiving the shaft. The sprocket has a plurality of teeth disposed around the periphery of the body. The teeth are angularly spaced about the axis such that each tooth is spaced from the adjacent teeth by a first opening, for application of a cleaning medium or other medium as discussed in greater detail herein. Each tooth has a belt-contacting surface which is convex in shape such that the outer-most periphery of the sprocket is generally circular. The belt-contacting surfaces of the teeth guide the belt around the periphery of the sprocket in order to minimize the ability of the belt to buckle.

The first opening may be circular, trapezoidal, or any other shape. The first opening is configured expose the underside of the belt to cleaning medium.

The teeth may each further comprise a second tooth such that pairs of teeth are disposed around the periphery of the body, the each pair being spaced from the adjacent pair by the first opening. Each tooth of a pair of teeth may be spaced from the other tooth of the pair by a second opening. The second opening is configured to engage a rib of the belt. The second openings may be configured to be larger than the corresponding ribs to allow cleaning medium to pass between the sprocket and the ribs.

A cleaning system may be arranged proximate to the sprockets such that a cleaning medium is sprayed through the first opening into the opening disposed adjacent to the underside of the belt when the belt engages with the sprocket. The cleaning system may include a manifold in combination with spray nozzles pointed toward the sprocket and/or belt.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1A:
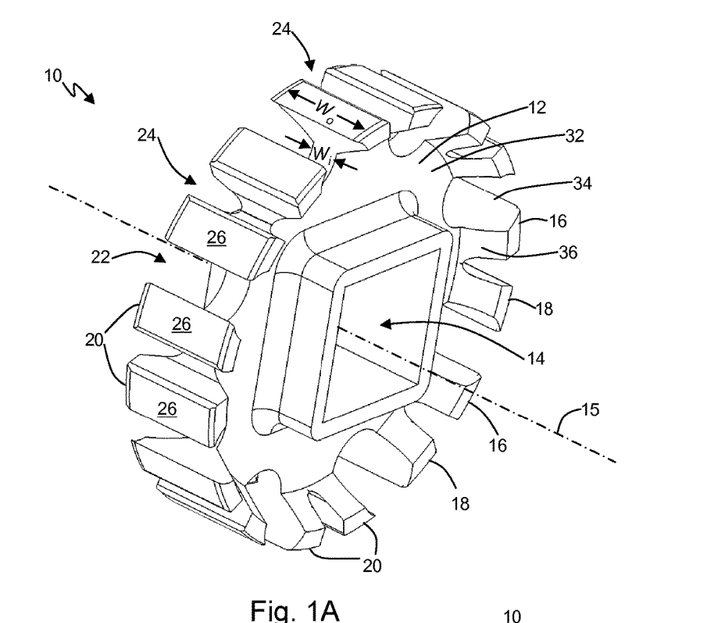
FIG. 1A is a perspective view of a sprocket suitable for use with a flat belt.
Figure 1B:
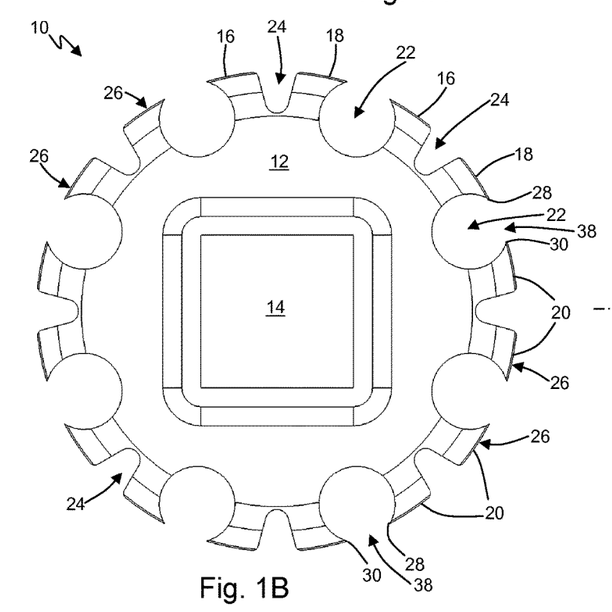
FIG. 1B is a side elevational view of the sprocket of FIG. 1A.
Figure 1C:
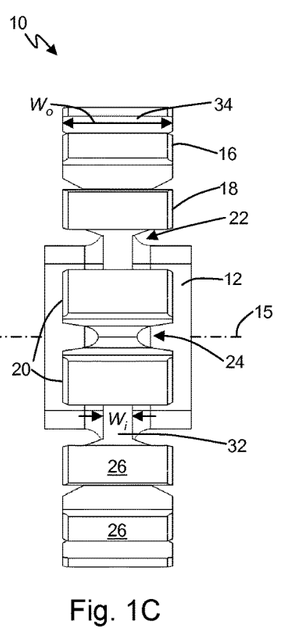
FIG. 1C is an end elevational view of the sprocket of FIGS. 1A and 1B.

FIGS. 1A-1C depict a sprocket 10 having a body 12 which may be constructed from stainless steel, plastic, or other suitable materials generally known to be food compatible and easily cleanable. The sprocket 10 includes a central opening 14 for engaging a shaft (not shown). The shaft may be a drive shaft. The central opening 14 may be shaped to cause the sprocket 10 to rotate as the shaft is rotated; for example, the central opening 14 may be formed in the shape of a square. In this manner, the sprocket 10 may rotate about an axis 15 that is coincident with the shaft in order to drive a belt 90 (see, e.g., FIG. 2). The sprocket 10 may be an idling sprocket which is rotated about the axis 15 by movement of the belt 90 around the sprocket 10. The central opening 14 may be formed in other shapes to accommodate different shaft geometries as will be evident to those of ordinary skill in the art based on this disclosure.

The sprocket 10 has a plurality of teeth 16, 18 disposed in pairs 20 around the periphery of the body 12. Each tooth 16, 18 has a belt-contacting surface 26. The belt-contacting surface 26 is convex in shape such that the outer-most periphery of the sprocket 10, as defined by the belt-contacting surfaces 26 of the teeth 16, 18, is generally circular. The discontinuous circle formed by the belt-contacting surfaces 26 of the teeth 16, 18 is centered on the axis 15 and guides the belt 90 around the periphery of the sprocket 10 in order to minimize the ability of the belt 90 to buckle.

Figure 2:
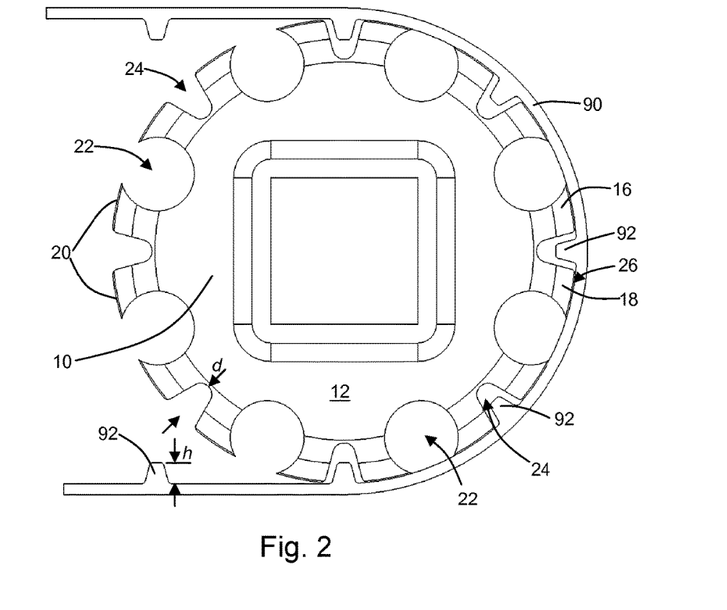
FIG. 2 is a side elevational view of the sprocket of FIGS. 1A-1C with a flexible belt engaged thereon.
Figure 3:
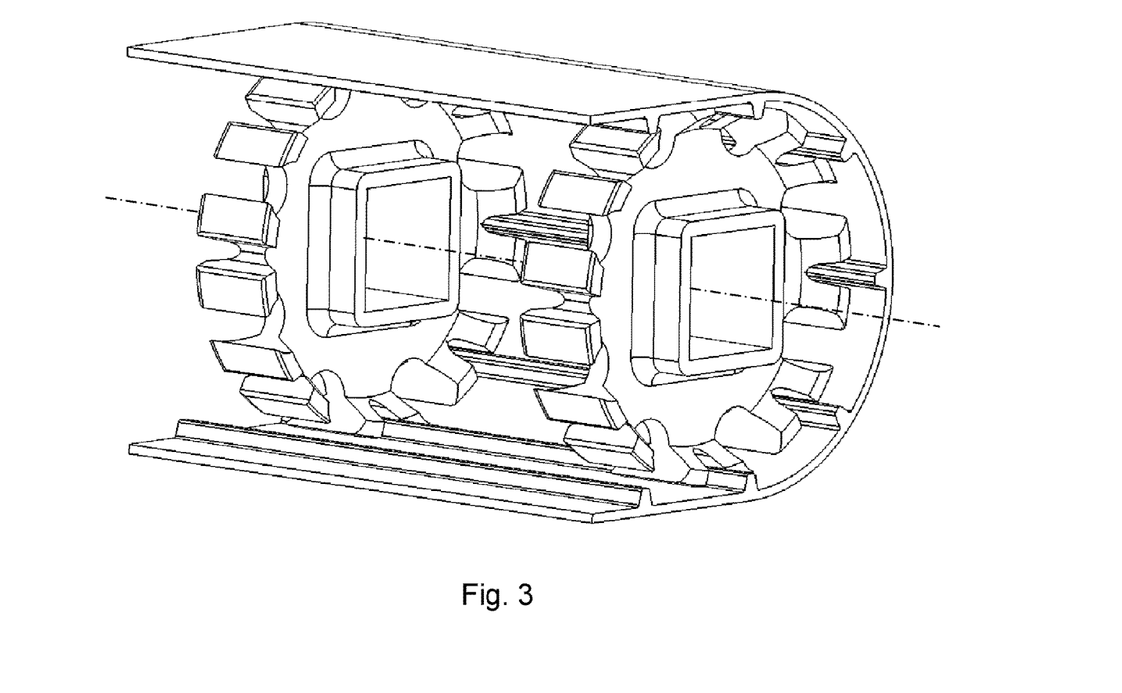
FIG. 3 is a perspective view of two sprockets and a flat belt engaged thereon.
Figure 4A:
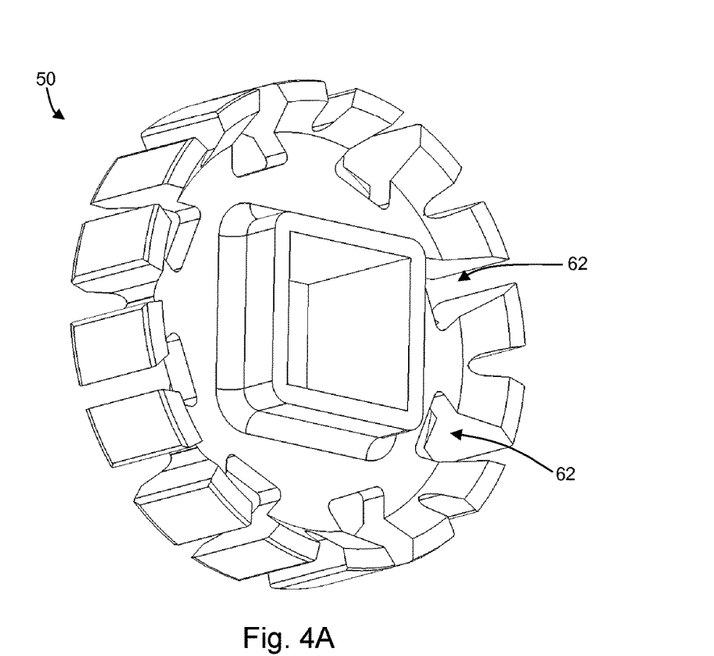
FIG. 4A is a perspective view of another sprocket suitable for use with a flat belt.
Figure 4B:
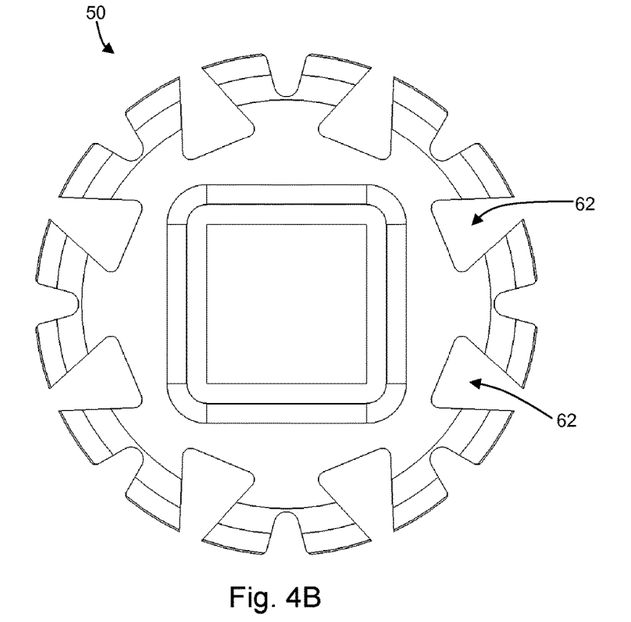
FIG. 4B is a side elevational view of the sprocket of FIG. 4A.
Figure 4C:
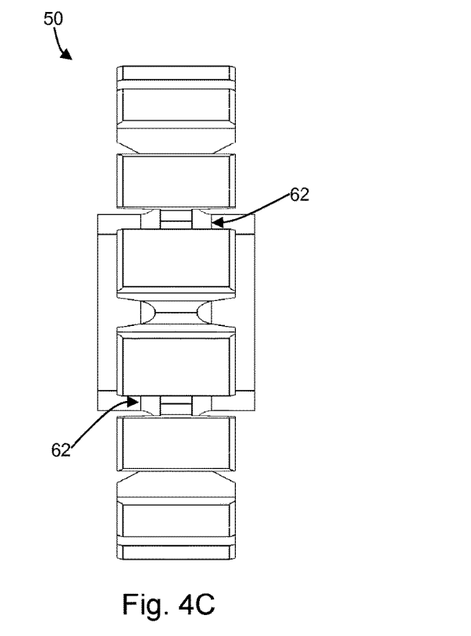
FIG. 4C is an end elevational view of the sprocket of FIGS. 4A and 4B.
Figure 5:
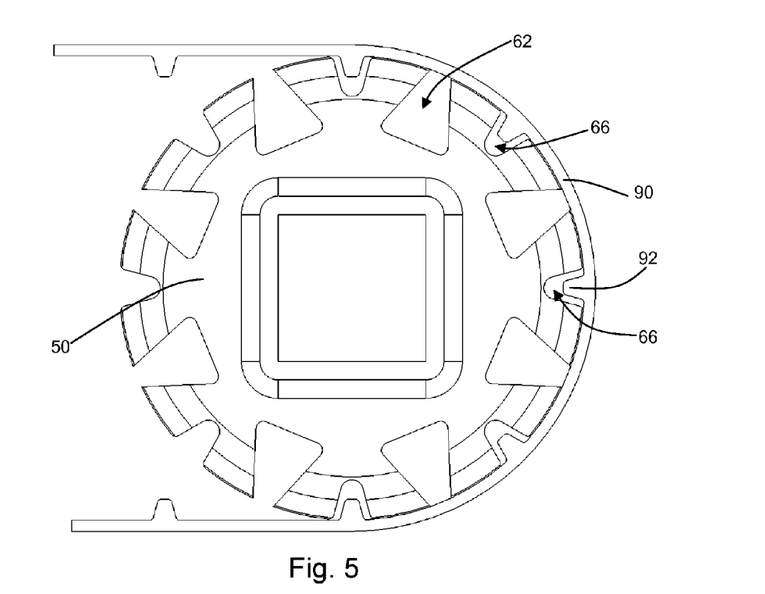
FIG. 5 is a side elevational view of the sprocket of FIGS. 4A-4C with a flexible belt engaged thereon.
Figure 6:
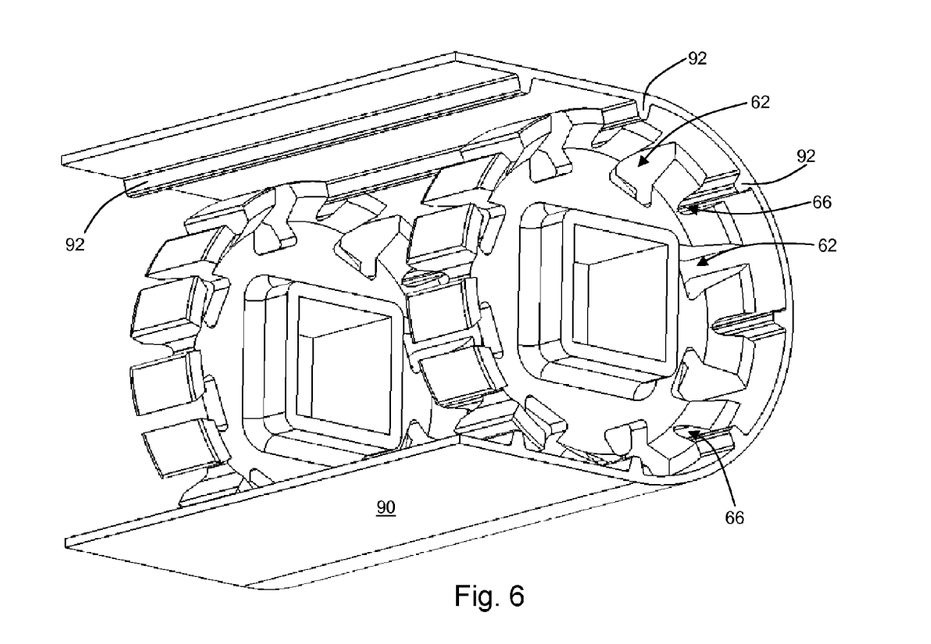
FIG. 6 is a perspective view of two sprockets with a flexible belt engaged thereon.

The pairs 20 of teeth are angularly spaced about the axis 15 such that each pair 20 of teeth is spaced from the adjacent pairs 20 of teeth by a first opening 22. The first opening 22 is configured to align with the underside of the belt 90 when the belt 90 is engaged with the sprocket 10 as best shown in FIGS. 2 and 3. In this way, the first opening 22 allows for cleaning medium sprayed generally toward the sprocket 10 and belt 90 to reach the underside of the belt 90. The first opening 22 may be shaped to allow access of cleaning medium to the belt 90 while maintaining a necessary amount of belt-contacting surface 26 of the teeth 16, 18 to prevent buckling of the belt 90. The cleaning medium may comprise a liquid, gas, a mixture of liquid and gas, a dust, a foam or any other form suitable for cleaning (collectively referred to as "medium," "fluid," or "cleaning fluid"). The medium may also serve other purposes in place of or in addition to cleaning such as sanitation or drying.

In the non-limiting example depicted in FIGS. 1B and 2, the first opening 22 is circular in shape where a chord of the circle intersects with the periphery of the sprocket 10 thus forming edges 28, 30. As such, the wide circular formation of first opening 22 allows ample cleaning medium to circulate, while the smaller peripheral gap created by edges 28, 30 allows the appropriate belt-contacting surfaces 26 to remain on the teeth 16, 18. The appropriate size of the gap created by edges 28, 30 will depend on the specific application. For example, the stiffness of the belt and/or the number and spacing of ribs in the belt will necessitate more or less support by the belt-contacting surfaces of the teeth of the sprocket. The edges 28, 30 or any edges formed by the elements of the disclosed sprockets may be beveled, rounded, or the like. The gap formed by edges 28, 30 may be considered a belt interface portion 38 of the first opening 22. Such belt interface portion 38 may be narrower than a largest diameter (or dimension) of the first opening.

Another embodiment of a sprocket 50 is depicted in FIGS. 4A-6, wherein the first opening 62 is trapezoidal. Other shapes and sizes suitable for the first opening will be evident to those of ordinary skill in the art based on this disclosure. The first opening may also comprise multiple openings. As such, a belt may be exposed to cleaning medium at more than one position between the ribs of the belt.

The belt-contacting surfaces 26 of the sprocket 10 may make up approximately 50 percent of the circumference of the sprocket 10 (the first openings 22 and second openings 24 making up the other 50 percent of the circumference). The belt-contacting surfaces 26 may make up more or less then 50 percent of the circumference of the sprocket 10 depending on the application (e.g., belt stiffness, number and spacing of ribs, etc.).

Each tooth 16, 18 of a pair 20 of teeth may be spaced from the other tooth 18, 16 of the pair 20 by a second opening 24. The second opening 24 is configured to engage a rib 92 of the belt 90. The second opening 24 may be, for example but not limited to, tapered in shape to engage a tapered rib 92. The second opening 24 may be configured to be larger than the corresponding rib 92. For example, a depth d of the second opening 24 may be greater in length than a height h of the corresponding rib 92. In this manner, cleaning medium may pass between the sprocket 10 and the rib 92 while the belt 90 is engaged by the sprocket 10 in order to flush contaminants from the rib 92 area of the belt 90.

The body 12 of the sprocket 10 may have a longitudinal width which varies. For example, as best shown in FIG. 1A, an inner portion 32 of the body 12 may have a width $W_i$ which is less than a width $W_o$ of an outer portion 34 of the body 12. In this manner, the volume of material necessary for the body 12 and the mass of the body 12 may be minimized (due to the relatively narrow width $W_i$ of the inner portion 32) while still providing a large belt-contacting surface 26 (due to the relatively large width $W_o$ of the outer portion 34). The body 12 may further have a transition portion 36 where the width gradually increases from $W_i$ to $W_o$.

Figure 8:
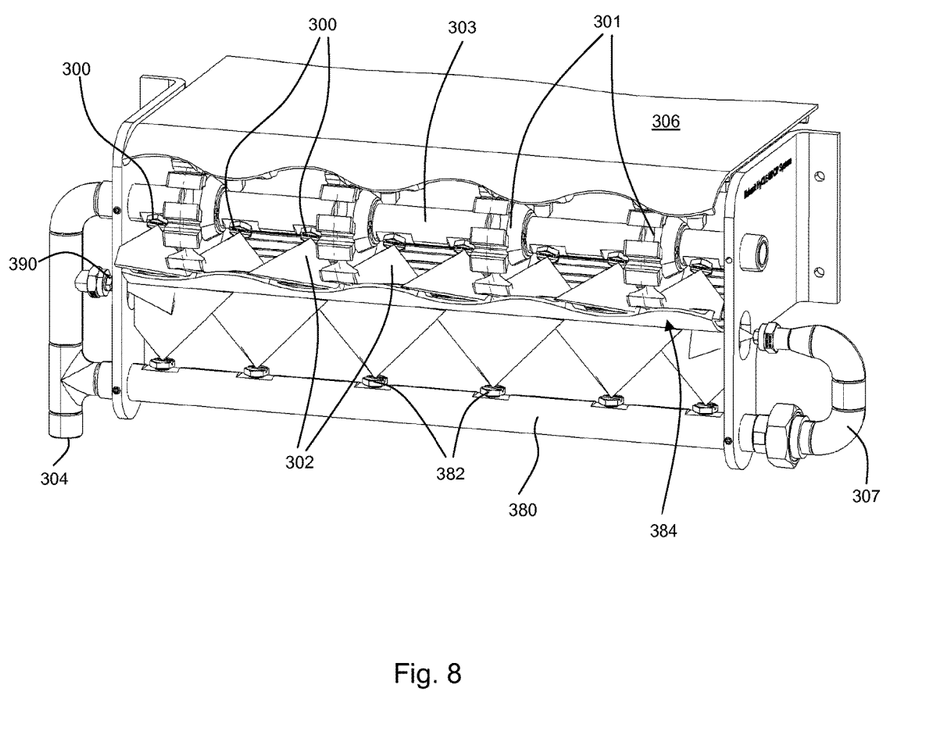
FIG. 8 is a perspective view of a belt traversing over sprockets and a cleaning-in-place system of the present invention, with a portion of the belt removed for clarity.
Figure 9:
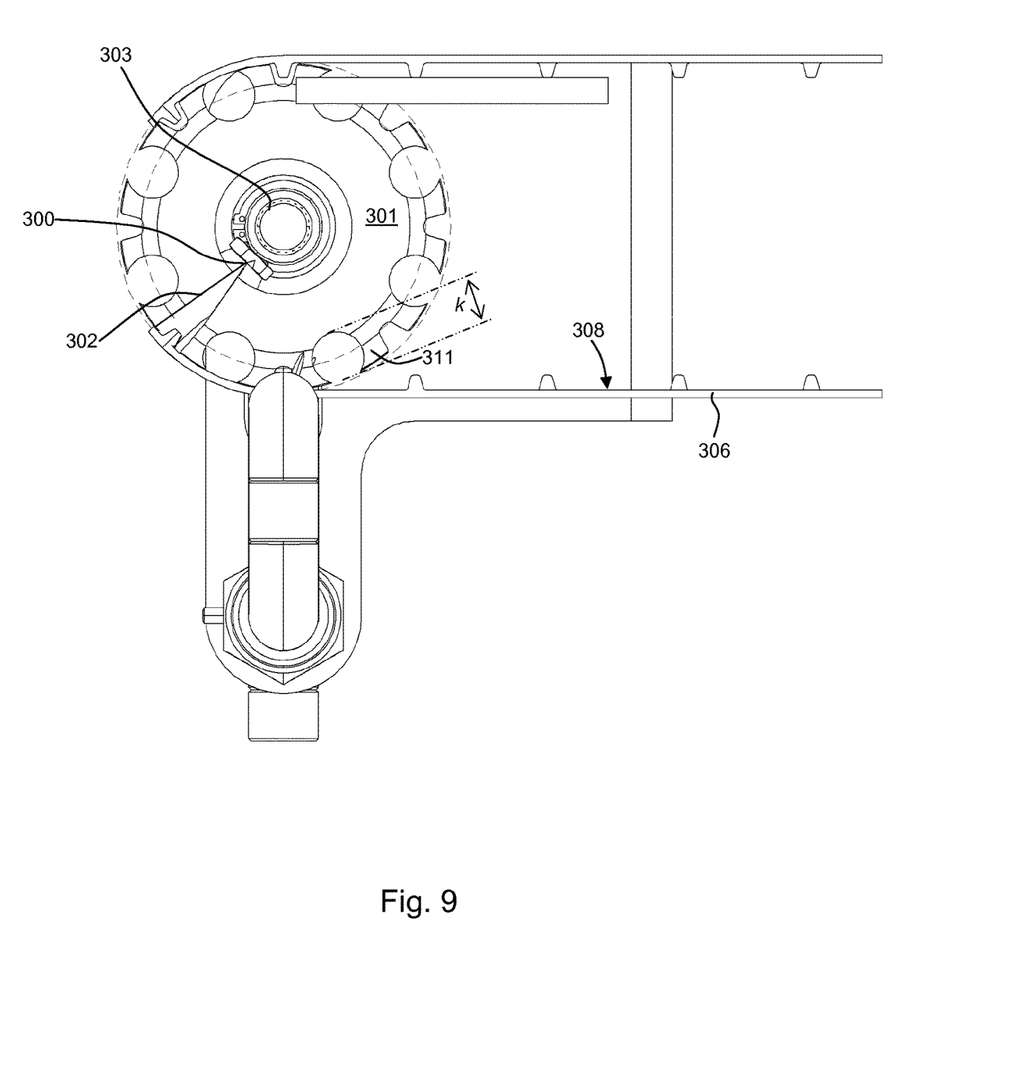
FIG. 9 is a side view of the cleaning-in-place system of FIG. 8, with a side and a portion of the belt removed for clarity.

The reduced width $W_i$ of the inner portion 32 also has the benefit of improving access of cleaning medium to the underside of belt 90, especially to a portion of the belt 90 which is located between two sprockets (see, e.g., FIG. 8, which shows where a V-shaped spray of cleaning medium may be less hindered by a reduced width $W_i$).

Turning to FIG. 2, the sprocket 10 is shown engaged with the belt 90. The belt-contacting surfaces 26 of the teeth 16, 18 engage with and ease the belt around the periphery of the sprocket 10 and the second openings 24 engage with the transverse ribs 92 of the belt 90. Also, the first openings 22 provide large openings and improved access to the underside of the belt 90 for cleaning when the belt 90 passes over the sprocket 10, while still maintaining sufficient belt-contacting surface 26 to minimize the risk of buckling of the belt 90. The relation of the first openings 22 and the inner portion 30, transition portion 34, and outer portion 32 of the sprocket may allow improved access of the cleaning medium to the belt 90. Similarly, the varying width of the body 12 at the second openings 24 may allow improve access of the cleaning medium to the ribs 92.

Figure 12:
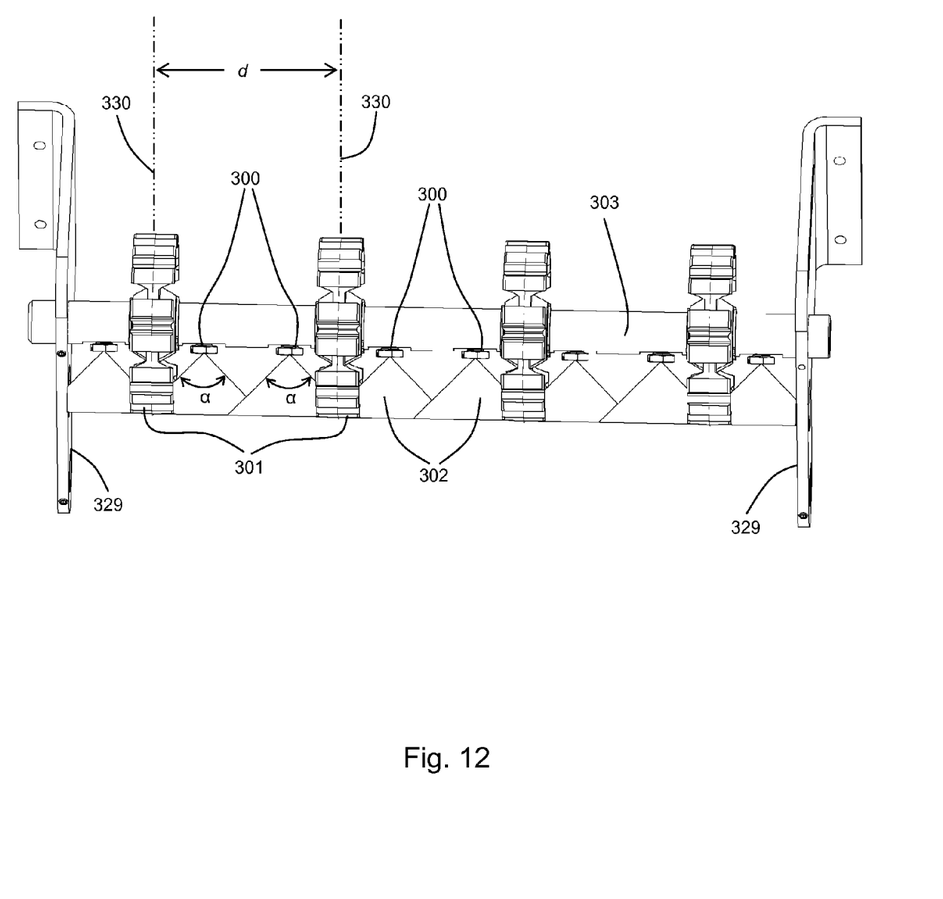
Figure 13:
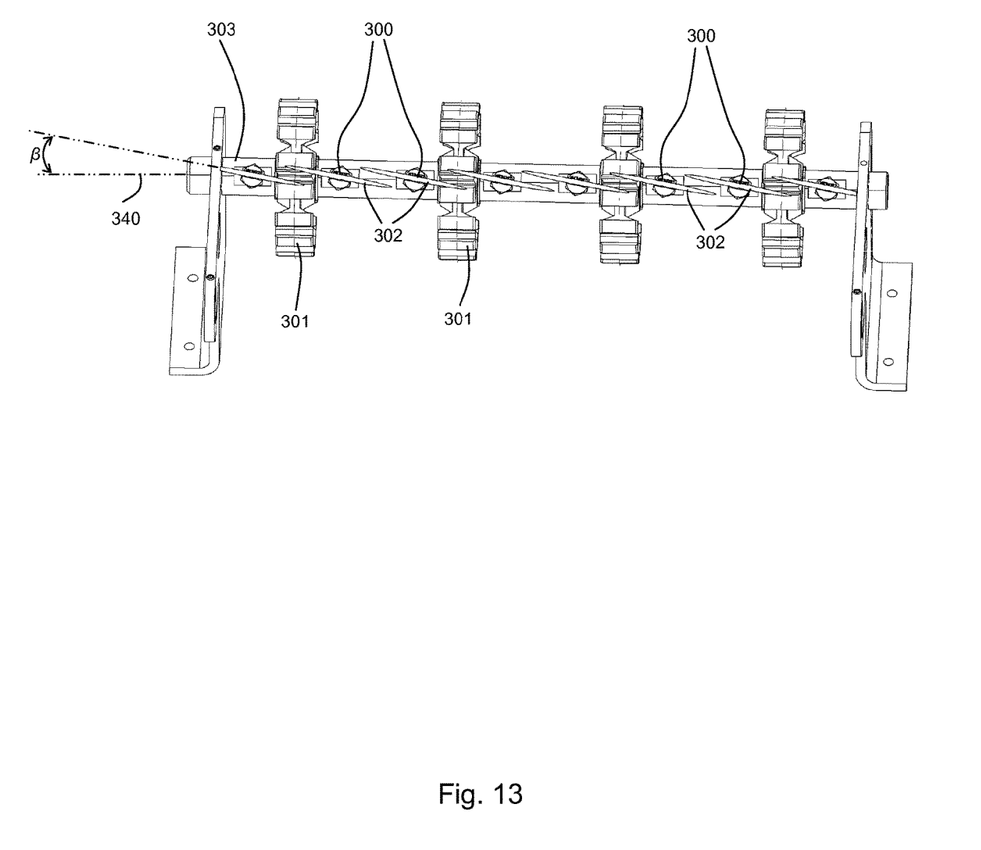
FIG. 13 is a further rotated view of a portion of a cleaning-in-place according to an embodiment of the present invention.

The sprockets described above are designed such that the underside of the belt is generally accessible regardless of the position of the sprocket. This sprocket design combined with the spray techniques described in detail below provide for optimal cleaning of flat belts. As shown in FIGS. 8-13, spray nozzles 300 are located on a sprocket shaft 303. The shaft 303 comprises a stationary hollow shaft or thick-walled tube. The sprockets 301 rotate on the shaft 303 which may be constructed of steel or other materials or may be coated with a ceramic or plastic coating. The cleaning medium enters through an inlet 304 and passes through the hollow shaft 303 and exits the shaft 303 as a spray 302 through the nozzles 300. As best shown in FIGS. 11-13, the nozzles 300 are primarily disposed on the shaft 303 between the sprockets. There may also be a nozzle 300 located at the end of a curved section 307 extending from the end of the shaft 303. Location of the nozzles 300 on the shaft 303 provides for an optimal spray angle α as described in greater detail below.

The sprays 302 are designed to be generally flat (best shown in FIG. 13) to minimize medium consumption and to improve the ability of the spray to enter into the openings k (FIG. 9) between the sprocket teeth 311 and onto the underside 308 of the belt 306.

As described in greater detail below, the best cleaning performance at minimal cleaning medium consumption is achieved with a combination of spray angle and pressure, relative to the sprocket diameter (i.e., distance of spray nozzle from the belt surface). The temperature of the cleaning medium also needs to be adapted to the specific process. Also, the supply of the cleaning medium may be controlled by a customized program to limit the spray time for lowest possible use of cleaning medium. The program may be adapted to the specific requirements of the customer production process.

As shown in FIG. 8, the cleaning-in-place system of the present invention may be installed on the idling or non-driven shaft 303 of a flat conveyor belt 306. The belt 306 runs over a plurality of sprockets 301. The sprockets 301 are rotatably mounted on the stationary hollow shaft or thick-walled tube 303. The shaft 303 is equipped with a number of spray nozzles 300 positioned between the sprockets 301. The spray is directed to the underside 308 of the belt 306 as it passes over the sprockets 301. The spray is directed approximately radially. As described above, the design of the sprocket 301 is made in such a way that the underside 308 of the belt 306 is largely not covered and therefore the cleaning medium can impinge the underside.

Turning to FIG. 12, the cleaning-in-place system is shown with the belt 306 and other components removed for clarity. The distance d between the center lines 330 of adjacent sprockets 301 determines the distance that the spray must travel and is determined by the spray angle α. With a larger spray angle, the sprockets 301 could be placed farther apart. As shown, a pair of supports 329 hold the stationary shaft 303 in position. The spray patterns overlap at each side.

Turning to FIG. 11, the overlap of sprays is sufficient to allow the cleaning medium to impinge the underside of the belt through the openings k between the sprocket teeth.

In FIG. 13, the spray nozzles 300 have a spray pattern 302 that is generally flat and therefore is better at entering the openings k between the sprocket teeth and at entering the rib-engaging gaps. The nozzles 300 are aligned at an angle β to the centerline 340 of the shaft 303. This angle may be between five and fifteen degrees, and is preferably ten degrees. This angle avoids disturbance between the spray patterns of adjacent nozzles 300 and ensures the penetration of the spray medium through the openings and gaps from both sides of the sprocket. As a result of the overlap, the belt surface can be fully covered.

The following table illustrates the spray configuration for a sprocket with a pitch diameter of 165 mm.

| | |
|---|---|
| Sprocket pitch diameter | 165 mm (6.5 in.) |
| Nozzle type | Lechler 612.487 16 |
| Spray angle | 120 degrees |
| Spray alignment | 10 degrees |
| Sprocket/nozzle increment | 150 mm (6 in.) |
| Number of nozzles per belt width | 6/m (2/ft.) |
| Fluid pressure (bar) | 2-10 bar (8 bar preferred) |
| Fluid consumption at 8 bar/nozzle | 3.19 liters/min. |

The sprocket pitch diameter should not be smaller than 130 mm (5 in.) and not larger than 200 mm (8 in.). For other sprocket sizes, the spray angles and/or the spray/sprocket distances may be adjusted. The nozzle identified above is a well known brand that is commercially available from several sources. Other nozzles would also be suitable as will be evident to those of ordinary skill in the art based on this disclosure.

Figure 10:
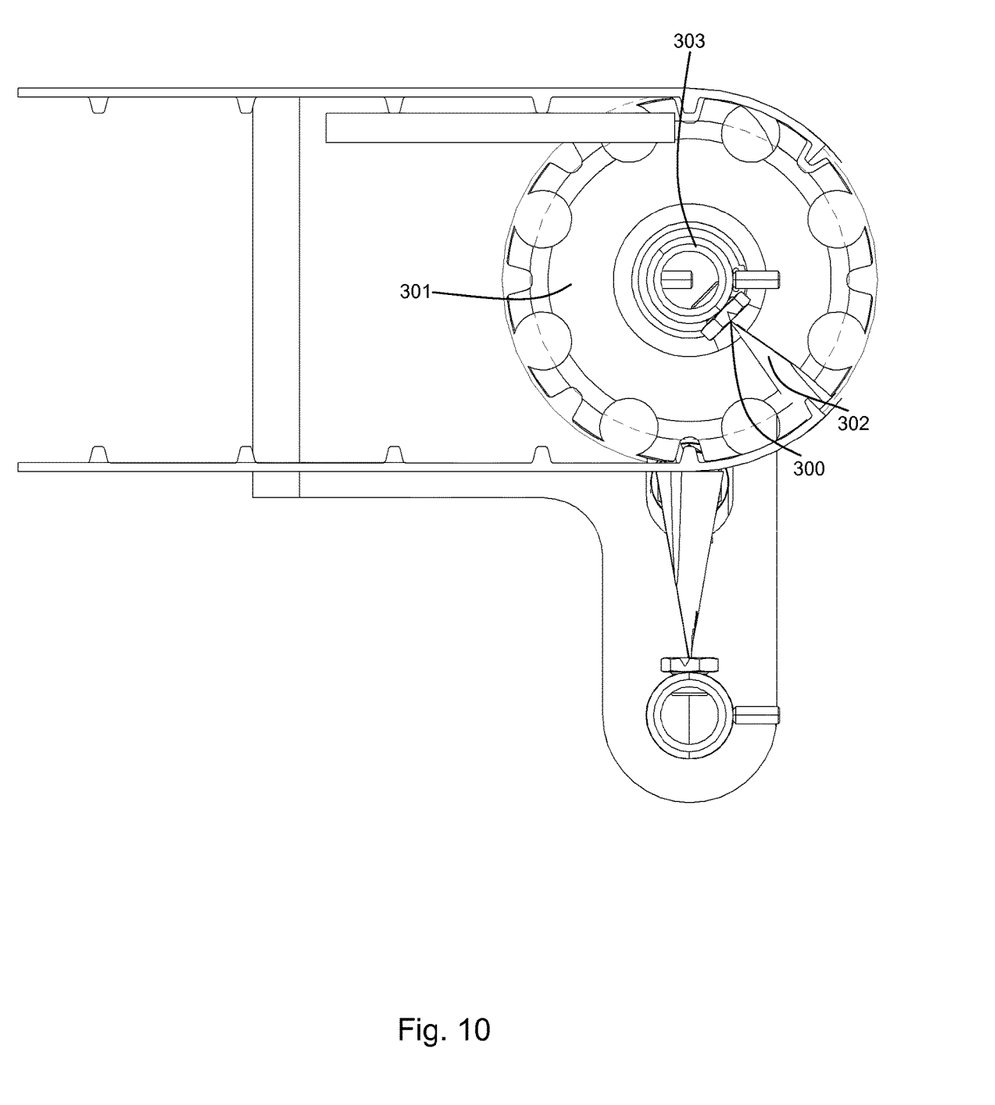
FIG. 10 is another side view of the cleaning-in-place system of FIGS. 8 and 9, with additional portions removed for clarity.
Figure 11:
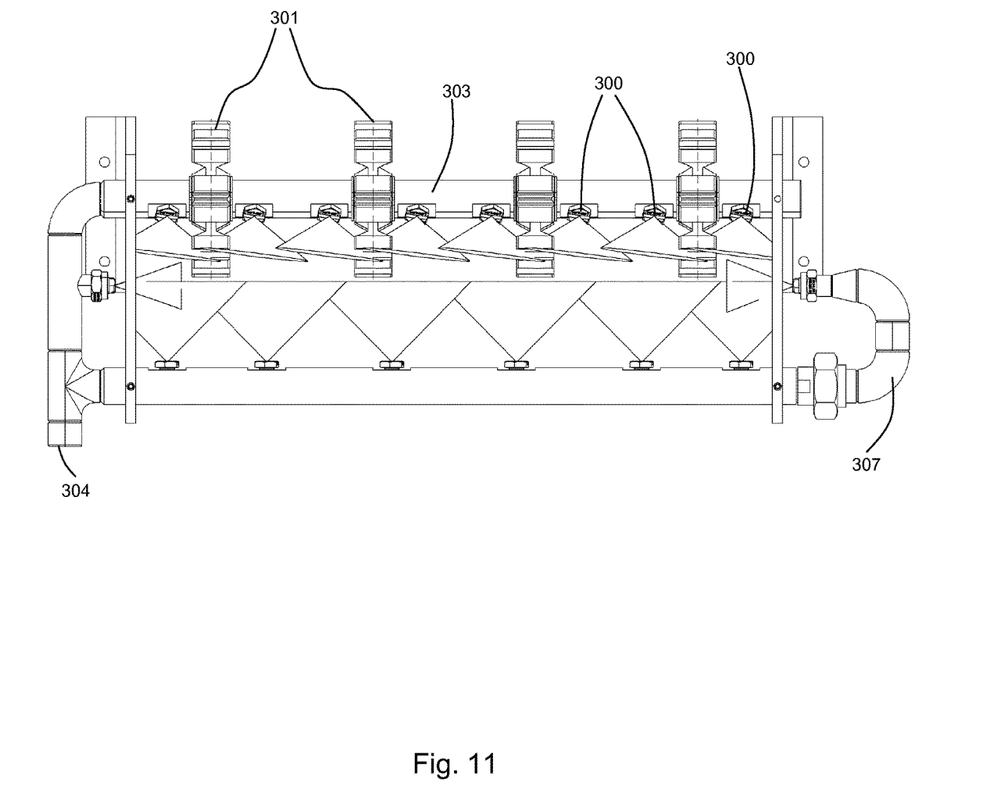
FIG. 11 is a front view of the cleaning-in-place system of FIGS. 8-10, with the belt removed for clarity; and, FIG. 12 is a rotated view of a portion of a cleaning-in-place according to an embodiment of the present invention.

A cleaning-in-place system of the present invention may further comprise a top surface cleaning manifold 380 which includes spray nozzles 382 configured to spray cleaning medium on the top surface 384 of the belt 306 (see, e.g., FIGS. 8, 10, and 11).

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A cleaning-in-place system for a flexible belt, the cleaning-in-place system comprising:
   a non-rotating hollow shaft, having an open, first end adapted for fluid communication with a source of a fluid under pressure;
   at least one sprocket rotatably mounted to the hollow shaft, the at least one sprocket rotating in driven relation about the shaft as the flexible belt passes over and around the at least one sprocket;
   a plurality of nozzle members mounted on the hollow shaft in laterally spaced relation to one another, each nozzle member being in fluid communication with the fluid under pressure;
   wherein the at least one sprocket comprises a body, the body having a first side, a second side, and a plurality of teeth disposed in pairs, the pairs being angularly spaced about a rotating axis of the sprocket, wherein each pair of teeth is spaced from adjacent pairs of teeth by a first opening extending from the first side of the body to the second side of the body, and wherein each tooth in each pair of teeth is spaced from the other tooth in the pair by a second opening extending from the first side of the body to the second side of the body, and wherein a belt-contacting surface of each tooth is convex such that the outer-most periphery of the body, as defined by the belt-contacting surfaces of the teeth, is generally circular.

2. The cleaning-in-place system of claim 1, wherein the plurality of nozzle members provide a flat spray pattern aligned along a line that is angled with respect to a longitudinal axis of the shaft by up to fifteen degrees.

3. The cleaning-in-place system of claim 1, wherein the plurality of nozzle members are aligned along a line that is angled with respect to a longitudinal axis of the shaft by approximately ten degrees.

4. The cleaning-in-place system of claim 1, wherein the at least one sprocket comprises a plurality of sprockets disposed along the shaft.

5. The cleaning-in-place system of claim 4, wherein at least one nozzle member is disposed between each pair of adjacent sprockets.

6. The cleaning-in-place system of claim 1, wherein at least one of the nozzle members is aligned such that spray from the nozzle member passes through the first opening formed between adjacent pairs of teeth on the sprocket.

7. The cleaning-in-place system of claim 1, wherein the spray from a first nozzle member overlaps with the spray from a successive nozzle member, through the first opening.

8. The cleaning-in-place system of claim 1, wherein the nozzle members produce a spray pattern having a spray angle of ninety to one-hundred twenty degrees.

9. The cleaning-in-place system of claim 1, wherein the fluid pressure is 2-10 bars.

10. The cleaning-in-place system of claim 1, wherein the sprocket pitch diameter is 130 to 200 mm.

11. The cleaning-in-place system of claim 1, further comprising:
- a manifold in fluid communication with the source of fluid; and
- at least one manifold nozzle member mounted on the manifold, the at least one manifold nozzle member being in fluid communication with the fluid under pressure;
- wherein the manifold is configured proximate a top surface of the flexible belt.

* * * * *